A. F. CHESEBROUGH.
Lard and Liquor Coolers.
No. 158,246.  Patented Dec. 29, 1874.
FIG I
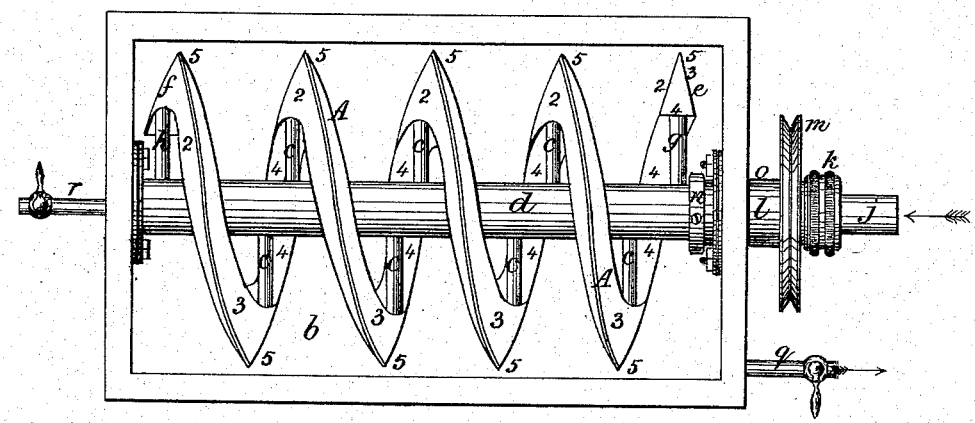
FIG II
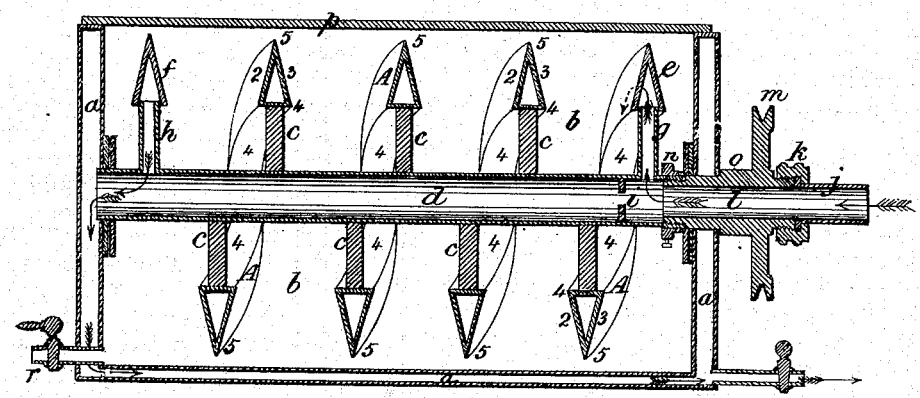
FIG III
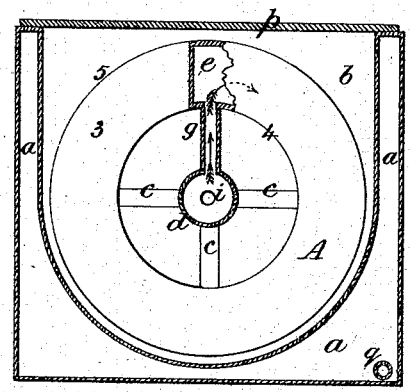
WITNESSES
John E. Laing
H. Rutherford
INVENTOR
Alexander F. Chesebrough
by Johnson & Johnson
his Atty's

UNITED STATES PATENT OFFICE.

ALEXANDER F. CHESEBROUGH, OF PHILADELPHIA, PENNSYLVANIA, ASSIGNOR OF ONE-HALF TO JOHN B. FORD, OF WASHINGTON, D. C.

IMPROVEMENT IN LARD AND LIQUOR COOLERS.

Specification forming part of Letters Patent No. 158,246, dated December 29, 1874; application filed June 30, 1874.

*To all whom it may concern:*

Be it known that I, ALEXANDER F. CHESEBROUGH, of Philadelphia, in the county of Philadelphia, and State of Pennsylvania, have invented certain new and useful Improvements in Lard and Liquor Coolers; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to apparatus for cooling lard and liquors preparatory to being put up for shipment; and the invention herein consists, broadly, in the combination of a revolving helical conduit for conducting the water directly through the body of the liquid in one direction, in combination with a chambered tank or vessel, into which the water passes and escapes in an opposite direction, in contact with the outer side of the cooling-tank, the said helix being supported by a hollow cylinder, which forms the communication between the helix and the chambered tank, whereby the circulation of the water is made continuous both inside and outside of the inner wall of the cooling-tank, the entire surface of the helix revolving within the liquid, while the water is forced through said helix, giving the advantage, in connection with the hollow cylinder, of cooling the center of the liquid in the tank, while the tank itself is cooled by the outside escaping current. My invention further consists of a hollow helical conduit, V-shaped in the cross-section of the hollow helix-blade, to present three separate and distinct cooling-surfaces, being the two angular sides and the base, while the point is next the inner surface of the tank, where the liquid is cooled from the outside, thereby utilizing the surface of the helix to cool the central portion of the liquid.

The helical carrying-cylinder is hollow, and its two ends of junction with the cylinder only are connected therewith by hollow arms, for the purpose of obtaining a central passage for the water in connection with its helical circuit; and in order to divert the water principally through the helix the hollow cylinder is partially closed at the receiving end back of the hollow arm which joins it with the helix, so as to make the area of the communication with the latter about two-thirds greater than that of the opening in the center cylinder, thereby causing a greater flow of water through the helix, whose extended three sides offer much greater cooling-surface within the liquid than the central conduit.

The facility for removing and replacing the helix to clean out the tank is afforded by a coupling passing through the hollow walls of the tank, screwed into the hollow cylinder and joined by a loose coupling-joint to the supply-pipe, the said coupling carrying the driving-sheave for the helix, and provided with outer and inner collars to hold the helix from axial movement, and this construction allows the helix to be taken out by simply removing the innercollar and unscrewing the coupling-sheave section.

In the accompanying drawings, Figure 1 represents a top view of a lard and liquor cooler embracing my invention; Fig. 2, a vertical longitudinal section of the same, and Fig. 3 a cross-section.

The tank has double walls with an intervening chamber, a, and the liquid is conducted from the rendering-vessels into the receiver b in any suitable way. This receiver has a curved bottom, and contains the revolving helical conduit A for cooling the liquid. It is mounted, by arms c, upon a hollow cylinder, d, suitably supported in the end walls of the tank, and the helical conduit is, in its cross-section, V-shaped, having three closed sides, 2 3 4, with the base 4 of the section toward the center of the tank, and the point 5 revolving in close proximity to the surface of the receiver. The inlet and exit ends e and f of the helix are joined to the hollow cylinder by tubular radial arms g h, to produce thereby two separate and distinct conduits for the water directly through the body of the liquid—that is, the helical conduit and its carrying-cylinder revolving together, so that their combined cooling-surface will be at or near the middle of the tank; and the water entering the central conduit at one end will pass through the helix and re-enter the central conduit at its discharge end, which communicates with the chamber a, and the water flowing through the cylinder and the helix enters the end of the intervening chamber a, and passes back on the outside of the receiver and out at the same end at which it entered, thereby obtaining a continuous and opposite direction directly through the body of the liquid and outside of the receiver thereof. On account of the extended cooling area of the helix-surface the greater portion of the volume of water passing into the cylinder should flow through the revolving helix, and to effect this the passage in the cylinder, at a point, $i$, just back of the tube $g$, which joins the helix with the cylinder, is made of less area than that of the junction-tube $g$, so that only enough water will pass through the cylinder to keep it cool, while the main current will be through the more extended cooling-surface of the helix. Both ends of the central conduit are fitted in stuffing-boxes, like those of the steam-cylinder, to render the joints tight, and the supply-pipe $j$ is connected to the central conduit by a free coupling-joint, $k$, so that the helix and its carrying-cylinder may be revolved independent of the supply-pipe. The central conduit is of a less length than that of the receiver, in order to allow the helix to be taken out to clean the receiver when required, and to be again adjusted in place, and a coupling-section, $l$, joins this conduit with the supply-pipe, the junction being made by a packed screw-joint, and the coupling-section $l$ turning in the stuffing-box, and carrying the sheave $m$, by which the helix is driven. This coupling-section also carries an inner and an outer collar, $n$ and $o$, which, bearing against the inner and outer sides of the tank, prevent the helix from having any endwise movement; and to admit of the separation of the coupling-section from the central conduit, the inside collar, $n$, must be first unfastened, by a screw or otherwise. The tank has a cover, $p$, which may be hinged, and the intermediate cooling-chamber has a cock, $q$, by which to let the water run off; but this cock must be so adjusted as to allow the chamber to fill after the liquid has obtained a certain degree of coolness.

The helical conduit, while thus serving to cool the liquor in which it revolves, also serves the usual function of stirring the liquor and keeping it in motion from one end of the receiver to the collar, so that every particle of the liquor will be stirred and cooled alike, and the liquor drawn off when cooled by a stopcock, $r$, in the usual manner.

I claim—

1. In a lard or liquid cooler, the combination of a revolving helical conduit for the water with a chambered tank or vessel, with which said helical conduit communicates through a central conduit, whereby a continuous circulation of the water is effected within and without the receiver of the liquid to be cooled.

2. The combination, in a lard and liquid cooler, of the revolving helical conduit with the revolving central carrying-conduit, having their inlet and issues at the opposite ends of said central conduit, to give the largest cooling-surface within the center of the liquid.

3. A revolving helical conduit for cooling liquids, having its cross-section of its blade bounded by three closed sides, which form cooling-surfaces throughout the extent of the helix.

4. A helical conduit constructed as described, in combination with the junction-pipes $g\ h$, the central conduit $d$, and the cooling-chamber $a$, whereby the helix and the central conduit discharge into the chamber at the same point.

5. The coupling-section A, in combination with central conduit $d$, the driving-sheave $m$, and the loose-jointed supply-pipe $j$, whereby the helix may be removed and replaced for the purpose stated.

6. The combination of the removable collar $n$ with the coupling-section $l$ and the revolving helix A, whereby the helix is prevented from endwise movement in its bearings.

In testimony that I claim the foregoing as my own I have affixed my signature in presence of two witnesses.

ALEXR. F. CHESEBROUGH.

Witnesses:
   W. S. JOHNSON,
   EUGENE J. LINDSAY.